(12) United States Patent
Mutchnik (10) Patent No.: US 8,806,118 B2
(45) Date of Patent: Aug. 12, 2014

(54) ADAPTIVE FIFO

(71) Applicant: SanDisk Technologies Inc., Plano, TX (US)

(72) Inventor: Sharon Mutchnik, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 86 days.

(21) Appl. No.: 13/668,702

(22) Filed: Nov. 5, 2012

(65) Prior Publication Data

US 2014/0126303 A1    May 8, 2014

(51) Int. Cl.
*G06F 13/00*    (2006.01)

(52) U.S. Cl.
USPC ........................................ 711/110; 711/111

(58) Field of Classification Search
USPC .................................. 711/110, 111
See application file for complete search history.

(56) References Cited

U.S. PATENT DOCUMENTS

| | | | |
|---|---|---|---|
| 6,434,676 B1 * | 8/2002 | Perloff | 711/154 |
| 7,174,394 B1 | 2/2007 | Garner et al. | |
| 7,535,789 B1 | 5/2009 | Fischaber et al. | |
| 7,573,770 B1 | 8/2009 | Zhang et al. | |
| 2005/0013395 A1 | 1/2005 | Kliesner et al. | |
| 2007/0091691 A1 | 4/2007 | Faue et al. | |
| 2008/0198671 A1 | 8/2008 | Wang et al. | |
| 2012/0239870 A1 | 9/2012 | Tung et al. | |

FOREIGN PATENT DOCUMENTS

KR    20070082817    8/2007

OTHER PUBLICATIONS

Technical Search Report, PRV Interpat, Date of Search Sep. 14, 2012, pp. 1-8.
"Understanding Synchronous FIFOs," Cypress Semiconductor Corporation, Jan. 1995, pp. 1-6.

* cited by examiner

*Primary Examiner* — Hoai V Ho
(74) *Attorney, Agent, or Firm* — Davis Wright Tremaine LLP (57) ABSTRACT

An adaptive synchronous FIFO includes a plurality of input data latch stages that sample variable-length input data at a write clock frequency, and a data compression circuit that combines the variable-length input data, together with partial-row data from a row of the FIFO storage array, and writes the combined data at a read clock frequency. The number of data latch stages is adaptive according to the ratio of the read and write clock frequencies.

19 Claims, 8 Drawing Sheets

ADAPTIVE FIFO

BACKGROUND OF THE INVENTION

This invention relates generally to First-In, First-Out (FIFO) circuits, particularly synchronous FIFOs, and to methods of using such synchronous FIFOs.

FIFOs are well-known circuits with many applications. In general, a FIFO includes a storage array made up of multiple rows. Write circuits write input data to a row and use one or more write pointers to determine the next row to be written. Read circuits read data from a row so that it can be provided as an output. Read circuits use one or more read pointers to determine the next row to read so that data is output in the order in which it was input (i.e. following the principle of "first-in, first-out").

In synchronous FIFOs, both read and write circuits operate based on a common clock. In some cases, while both read and write circuits operate based on a common clock, they may use different multiples of the common clock signal. For example, a clock signal may be used directly as a read clock (read clock frequency=RCLK), while the write clock has a frequency ("WCLK") that is some multiple of RCLK (e.g. 2*RCLK, 3*RCLK, 4*RCLK . . . etc.).

Figure 1:
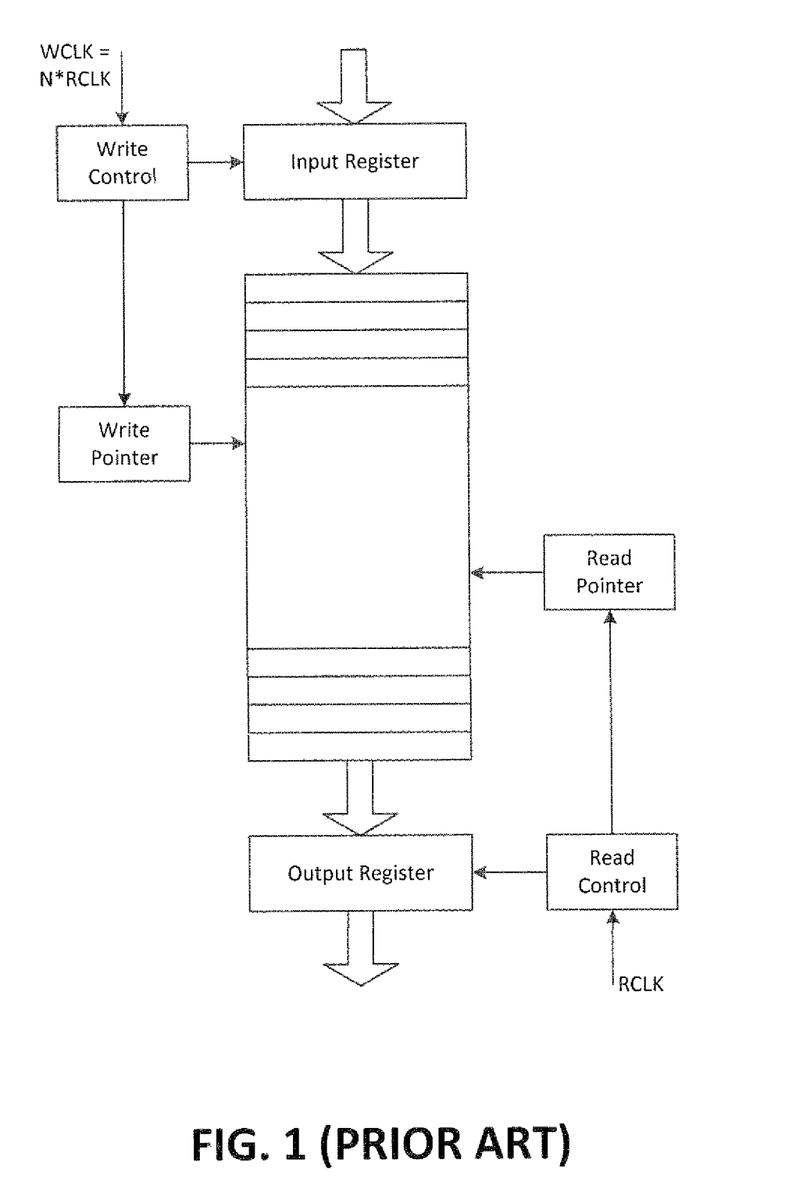
FIG. 1 shows a prior art synchronous FIFO circuit.

FIG. 1 shows an example of a synchronous FIFO according to the prior art. A dual port array forms the FIFO storage array in which data is stored in rows. Any suitable device may be used to form individual cells in such an array, for example SRAM, DRAM, flip-flop circuits, or other suitable circuits may be used. Data is received into an input register that is controlled by write control circuits. The write control circuits control transfer of the data from the input register to a row of the FIFO storage array. The write control circuits receive a write clock signal, with a frequency WCLK that determines the timing of data transfer from the input register to the FIFO storage array. A write pointer indicates the next row to be written in the FIFO array.

An output register is used to hold data that is read from a row in the FIFO storage array. The output register is controlled by read control circuits which receive a read clock signal with clock frequency RCLK. Because the example of FIG. 1 is a synchronous FIFO, the read clock is the same as the write clock, or is obtained by dividing the write clock, i.e. RCLK is equal to WCLK, or is a fraction of WCLK (e.g. WCLK/2, WCLK/3 . . . etc.). A read pointer indicates the next row to be read so that the data is read out in the same order in which it was written.

There are many applications for FIFOs in integrated circuits. For example, where data is transferred from one clock domain to another clock domain, a FIFO provides a convenient way to deal with timing issues that may occur because of differences in clock speeds. Synchronous FIFOs may be used where data is transferred between synchronous clock domains where one of the clock domains uses a clock signal that is a divided clock signal. Synchronous FIFOs may also be used in situations where clock speeds are the same at input and output sides, i.e. RCLK=WCLK. One application for synchronous FIFOs is in memory controllers, for example memory controllers used with NAND flash memory, and similar controllers. Such controllers may be formed as Application Specific Integrated Circuits (ASICs) that are customized for a particular application, or set of applications.

Several problems may occur in prior art synchronous FIFOs. For example, when using a high write clock speeds, and when dealing with variable-length data, prior art synchronous FIFOs are found to be inefficient. Thus, there is a need for a synchronous FIFO that can more efficiently deal with various conditions.

SUMMARY OF THE INVENTION

According to an embodiment of the present invention, a synchronous FIFO receives variable-length data and latches the data in latch stages at a write clock speed. The variable-length data from different latch stages is combined with partial-row data from a row of the FIFO storage array. The combined data is stored in the FIFO storage array. An indicator of data length may be stored in the FIFO storage array for each portion of variable-length data. A write pointer may indicate a row to be written along with an offset to indicate how much of the row is occupied. A read pointer may indicate a row to be read along with an offset to indicate the location of a data size indicator that gives the size of the next portion of data to be read.

According to an example, a method of operating a synchronous First-In, First-Out (FIFO) circuit, with variable-length data, includes: receiving variable-length data from an input; reading partial-row data from a partially-filled row of a FIFO storage array; appending the received variable-length data to the partial-row data; and storing the partial-row data, together with at least a first portion of the appended received variable-length data, in a first row of the FIFO storage array.

The method may include storing a second portion of the appended received variable-length data in a second row of the FIFO storage array. The storing the second portion of the appended received variable-length data in the second row may partially-fill the second row. The method may include updating a write pointer to indicate an offset from an end of the second row, the offset determined by the length of the second portion of the appended received variable-length data in the second row. The method may include storing an indication of the length of the variable-length data in the FIFO storage array. The input may operate at a write clock speed (WCLK), and the reading, the appending, and the storing may be performed at a read clock speed (RCLK) that is related to the write clock speed by: RCLK=WCLK/N, where N is a positive integer.

An example of a method of operating a synchronous First-In, First-Out (FIFO) circuit, at a fraction of a write clock speed, includes: receiving an input at the write clock speed (WCLK); sampling the input in N latches, where N is an integer that is greater than 1, each of the N latches sampling every N clock cycles; combining the contents of the N latches at a read clock speed (RCLK), the read clock speed given by: RCLK=WCLK/N; storing the combined contents of the N latches in a storage array at the read clock speed; and reading the storage array at the read clock speed.

The method may further include operating the FIFO with a first value of N at a first time, and subsequently operating the FIFO with a second value of N that is different to the first value of N. Changing from the first value of N to the second value of N may be in response to receiving a command. Changing from the first value of N to the second value of N may be in response to a determination by a configuration circuit that WCLK and/or RCLK has changed and a subsequent recalculation of N by the configuration circuit. The input may be of variable data-length and combining the contents of the N latches may include compressing the contents of the N latches if they are less than full. Combining the contents of the N latches may include combining partial-row data that is read out from a partially-filled, partially-empty row of the storage array.

An example of a synchronous First-In, First-Out (FIFO) circuit with variable clock ratio, includes: $N_{HW}$ input latch stages for receiving variable-length data, where $N_{HW}>1$; a FIFO storage array; and a data compression circuit that combines partial-row data from a row in the FIFO storage array with variable-length data from $N_{Config}$ of the $N_{HW}$ input latch stages prior to storing the combined partial-row data and the variable-length data together in the FIFO storage array.

The variable-length data may be received at a write clock speed (WCLK), and combined data may be stored at a read clock speed (RCLK), where WCLK=$N_{Config}$*RCLK. A configuration circuit may determine a value for $N_{Config}$ based on WCLK and RCLK, and may configure $N_{Config}$ of the $N_{HW}$ input latch stages to receive the variable-length data for combination with partial-row data, with remaining $N_{HW}$-$N_{Config}$ input latch stages configured to be idle.

An example of a synchronous First-In, First-Out (FIFO) circuit for variable-length data, includes: a FIFO storage array; an input latching unit for receiving variable-length data; and a data compression circuit that reads partial-row data from a partially filled row of the FIFO storage array, appends variable-length data from the input latching unit, and stores the partial-row data, together with at least a first portion of the appended variable-length data, in a first row of the FIFO storage array.

The input latching unit may contain N input latch stages. The input latching unit may receive a write clock signal and each of the N input latch stages may sample input data every N cycles of the write clock signal. The data compression circuit may read, append, and store at a read clock speed (RCLK) that is related to the write dock speed (WCLK) by: WCLK/RCLK=N.

Additional aspects, advantages and features of the present invention are included in the following description of examples thereof, which description should be taken in conjunction with the accompanying drawings. All patents, patent applications, articles, technical papers and other publications referenced herein are hereby incorporated herein in their entirety by this reference.

DETAILED DESCRIPTION OF EXEMPLARY EMBODIMENTS

Figure 2:
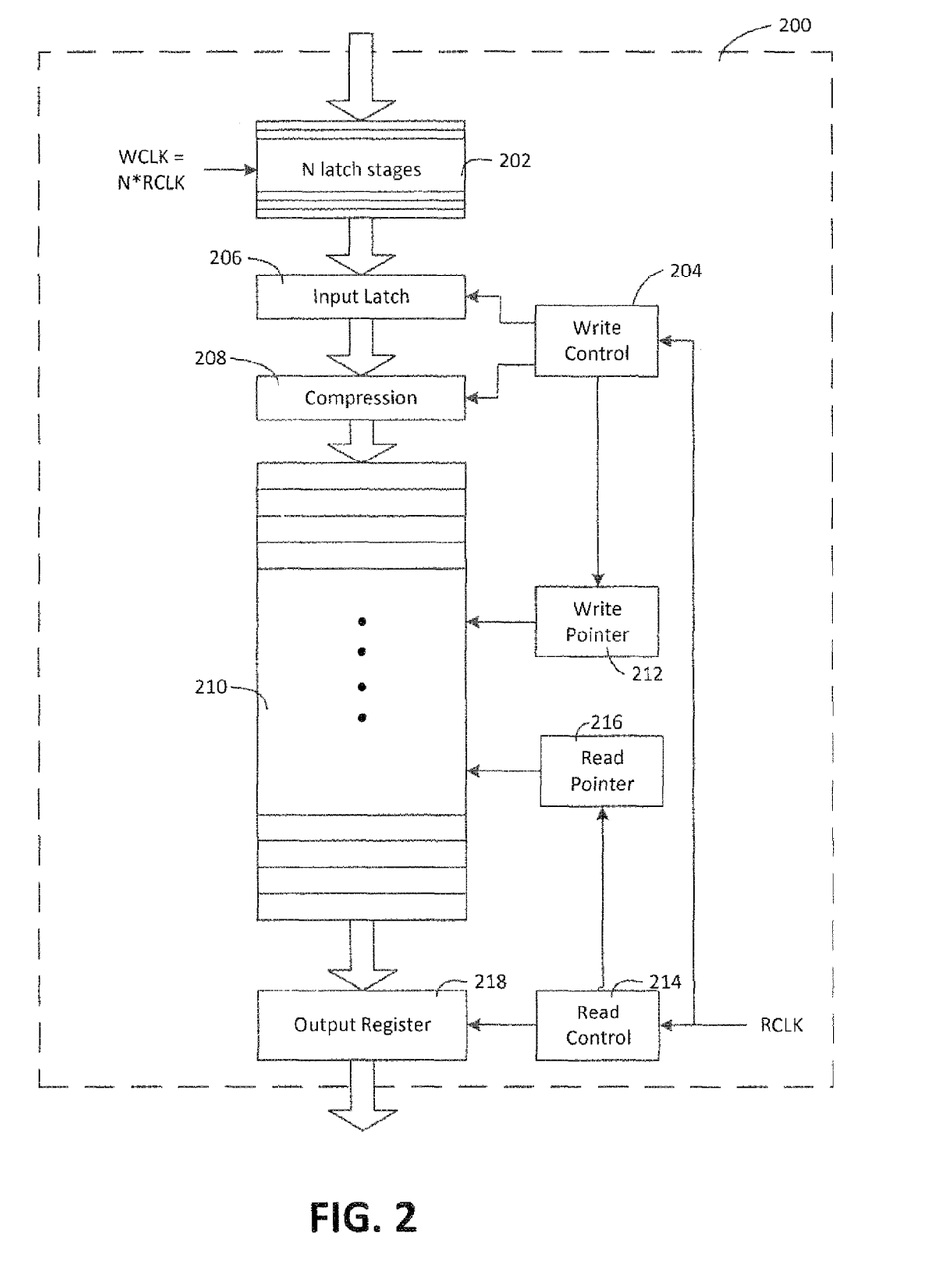
FIG. 2 shows an example of a synchronous FIFO circuit with N latch stages.

FIG. 2 shows certain components of a synchronous FIFO 200 according to an embodiment. Several differences can be seen with respect to the prior art FIFO of FIG. 1. In particular, input data is received by a set of N latch stages 202 which operate using a write clock, with clock frequency WCLK. Input data is transferred from the N latch stages 202 to an input latch 206, and then to a compression circuit 208, before being transferred to the FIFO storage array 210. The input latch 206 and compression circuits 208 are under the control of write control circuits 204 which receive a read clock signal, with clock frequency RCLK. In contrast to prior art circuits, RCLK, not WCLK, is used by write control circuits to perform write operations at read clock frequency. Data transfers from the input latch 206 to the compression circuits 208, and from the compression circuits 208 to the FIFO storage array 210, are executed at the read clock frequency RCLK, which may be some fraction of WCLK. A write pointer 212 indicates a location where the data is to be stored. The write pointer is under the control of write control circuits 204 and is updated at the read clock frequency RCLK. Read control circuits 214 operate to manage a read pointer 216 to control reading of data from the FIFO storage array 210 to an output register 218.

Figure 3:
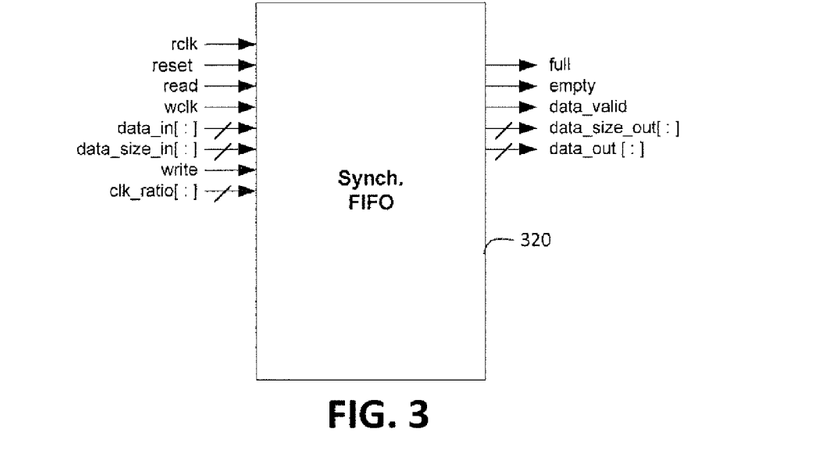
FIG. 3 shows input and output interfaces for an example of a synchronous FIFO.

FIG. 3 illustrates a FIFO circuit 320 symbolically, indicating certain aspects of the input and output interfaces according to an embodiment. Two clocks are provided, RCLK and WCLK. In addition to a data input ("data_in") there is a data size input ("data_size_in") that specifies the size of a variable-length data word provided. An optional clock ratio input ("clk_ratio") is provided so that the clock ratio may be specified externally and may be received by the FIFO. A reset input is provided to reset the contents of the FIFO storage array (e.g. force all flip-flops to known state, and return pointers to default positions).

Figure 4:
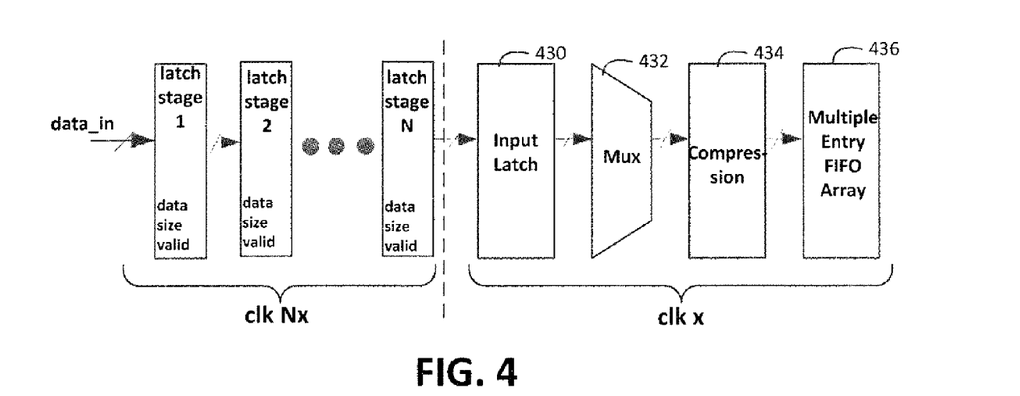
FIG. 4 shows certain components of an example of a synchronous FIFO circuit.

A detailed view of a portion of a synchronous FIFO including multiple latch stages is shown in FIG. 4. Input data "data_in" is shown going to a series of latch stages numbered from 1 to N operating at a write clock frequency Nx, where x is the read clock frequency used for much of the FIFO. An input data word is sampled in latch stage 1 and is then latched sequentially to latch stage 2—latch stage N on successive cycles the clk Nx with additional data words sampled and transferred on successive cycles. Thus, where an input supplies valid data words on each clock cycle, all latch stages contain valid data after Nx cycles of clk Nx (i.e. after one cycle of clk x). The valid sampled data is then transferred to an input latch 430. This transfer is driven by clk x, not clk Nx. From this point onwards, the FIFO operates at elk x and thus operates at a lower speed than similar circuits in many prior art FIFOs. This can save power and reduce complexity and cost. The dashed vertical line signifies the transition from the clk Nx domain to the clk x domain. Thus, it can be seen that a significant portion of the FIFO is in the clk x domain.

Data from different latch stages 1-N that is stored in the input latch is multiplexed (muxed) together in a muxing stage 432 so that the contents of the different latch stages are transferred together to a compression stage 434. Thus, the muxing stage may be considered to perform a first part of compression. In the compression stage, the contents of the latch stages, along with any data from a partially filled row in the FIFO storage array 436 are combined in a manner that compresses the data by ignoring unwritten bytes in the latch stages and unwritten space in a row of the FIFO storage array.

According to an embodiment, data from latch stages may be sent to the input latch only if there is valid data in the corresponding latch stage. Where a host sends variable-length data, the length may be zero, i.e. there may be no valid data in a given latch stage for a given clock cycle. Instead of combining such empty latch contents, a flag is used to indicate whether a given latch stage contains valid data. This latch stage may be checked prior to transferring the contents of the latch stage to the input latch.

Figure 5:
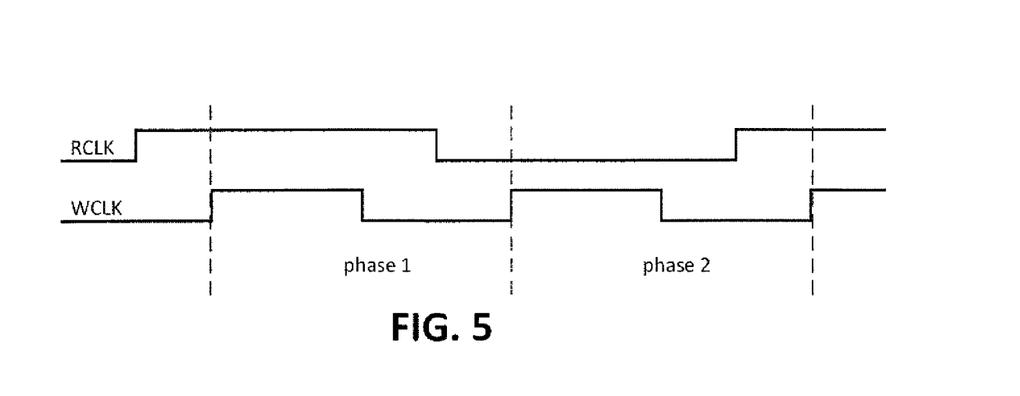
FIG. 5 is a timing diagram for an example of a 2:1 clock ratio.

FIG. 5 shows an example of a timing diagram where WCLK=2*RCLK. In this example where there are just two latch stages, each latched during alternate cycles of WCLK, phase 1 represents the phase for sampling a first data word from the input into latch stage 1 at the WLCK rising edge. Phase 2 represents the phase for sending the first data word from latch stage 1 into latch stage 2, and sampling a second data word from the input at the WCLK rising edge. Valid data may be sent during none, one, or both, of these phases depending on what has been received at the input. Also at phase 2, at the rising edge of the read clock signal, RCLK, only valid contents from latch stages 1 and 2 are passed into the input latch.

If valid input data is present only in latch stage 1 (i.e. no valid data in latch stage 2), then a valid data flag is set for latch stage 1. At the next WCLK edge, this data (along with the valid flag and the data size) is sent to latch stage 2, while new data may be latched into latch stage 1. After two WCLK edges as shown in FIG. 5, there are four possible scenarios: 1—no valid data in either latch stage; 2—valid data only in latch stage 1 (not latch stage 2); 3—valid data only in latch stage 2 (not latch stage 1); 4—valid data in both latch stage 1 and latch stage 2. In any of the three cases in which valid data is present, data is latched out of the latch stages into the input latch at RCLK speed. Thus, even though data may be latched into the latch stages at WCLK, it is latched out at a lower speed, RCLK.

According to some embodiments, when variable-length data is received it may be combined with other variable-length data for more efficient storage. For example, the contents of a latch stage that is half-full may be combined with the contents of another latch stage that is half-full so that the contents of the two latch stages are written together to a row of the FIFO storage array. Contents of several latch stages may be combined in this manner for more efficient storage. In order to combine the contents of the latches it is necessary to know the length of the variable-length data in each latch stage. A data size indicator that indicates the size of each data word may be provided as part of the parallel input. Thus, the amount of valid data in each latch is known and only valid data may be stored in the FIFO storage array. Combining valid data from different latch stages in this manner may be considered as a form of compression.

In addition to combining variable-length data for more efficient storage, such variable-length data may be appended to partial-row data that is already written in the FIFO array. Partial-row data may be read out of the FIFO storage array. The variable-length data may be appended to the partial-row data, and the combined partial-row data and the appended variable-length data may be written back to the FIFO storage array so that space is efficiently used. Such combining of variable-length data and partial-row data may be considered as a form of data compression.

Figure 6:
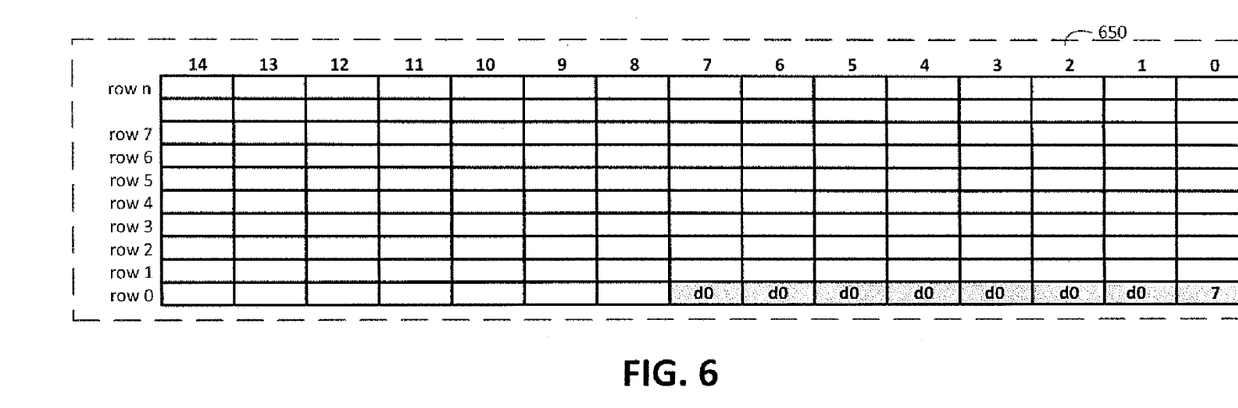
FIG. 6 shows data d0 stored in a FIFO storage array.
Figure 7:
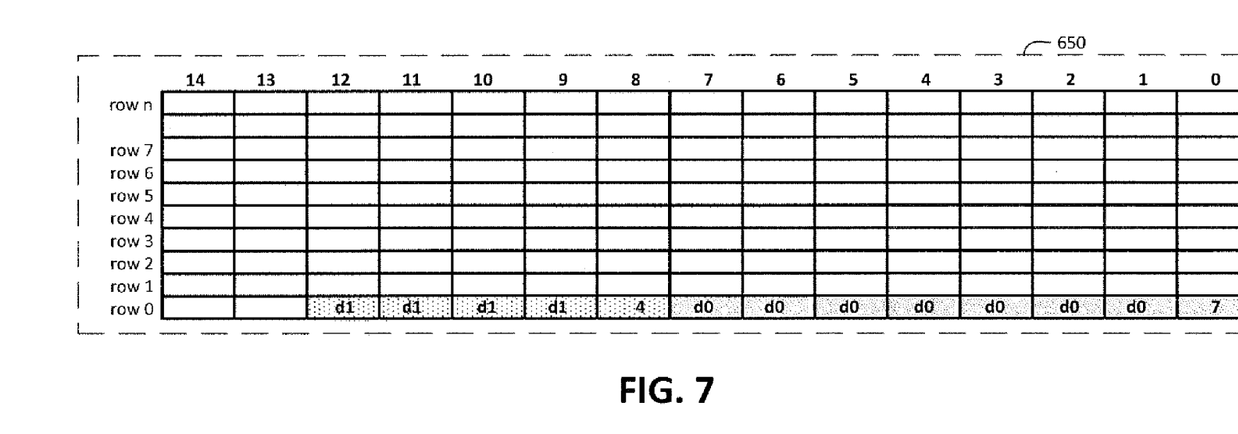
FIG. 7 shows data d0 and d1 stored in the FIFO storage array.
Figure 8:
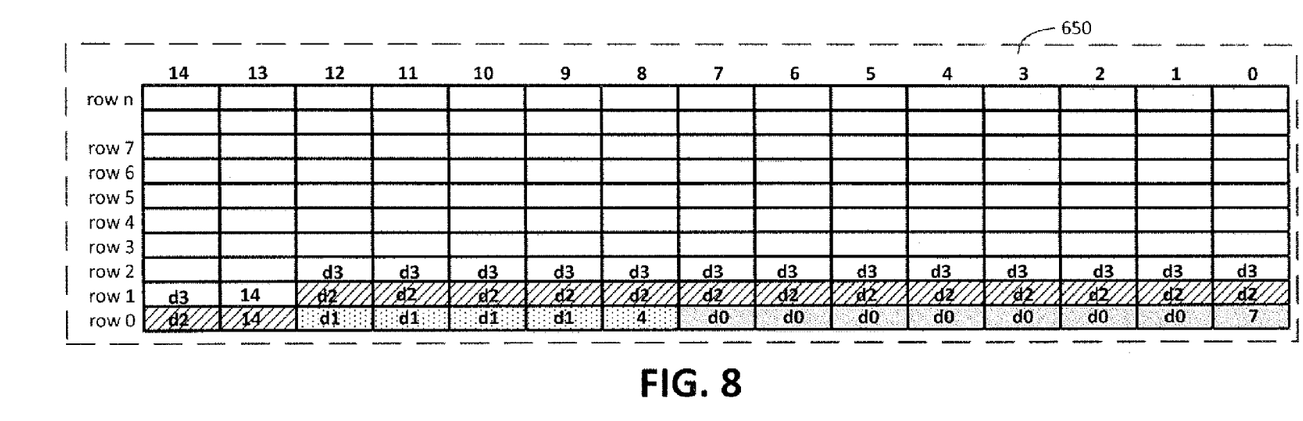
FIG. 8 shows data d0, d1, d2, and d3 stored in the FIFO storage array.

FIGS. 6-8 illustrate certain examples of how variable-length data may be combined with other variable-length data, and with partial-row data, to achieve efficient data compression in a FIFO storage array.

FIG. 6 shows an example of a FIFO storage array 650 that contains n rows, with each row having a capacity to store 15 bytes of data. Seven bytes of data "d0" are written in the FIFO storage array at this point, with one byte (byte 0) used to store size data (i.e. an indication that there are seven bytes of d0 data stored). A write pointer may indicate row 0, with bytes in use=8 bytes at this point (thus indicating not only the row but also indicating an offset within the row at which subsequent writing may start). A read pointer may indicate row 0, with read pointer location indicating 0, the location of the start of the next data to be read, d0, and the location where size data for d0 is stored.

FIG. 7 shows the FIFO storage array 650 of FIG. 6 after an additional four bytes (d1) are stored and the first data (d0) is read. The write pointer remains on row 0 at this point, but bytes in use=13 (i.e. the offset has changed) reflecting the additional partial-row data in row 0. The read pointer points to row 0 but with pointer location indicating location 8, the location where the size data for the next data to be read (d1) is stored.

FIG. 8 shows the FIFO storage array 650 of FIG. 7 after two writes of 14 bytes each (d2, d3, plus one byte each for size data) and after data d1 is read. The write pointer indicates row 2, with bytes in use=13. The read pointer still points to row 0, but with a read pointer location of 13. Thus a subsequent read would begin by getting size information at location 13, indicating data size=14 bytes. The subsequent 14 bytes, up to row 1, byte 12, would then be read out.

Figure 9:
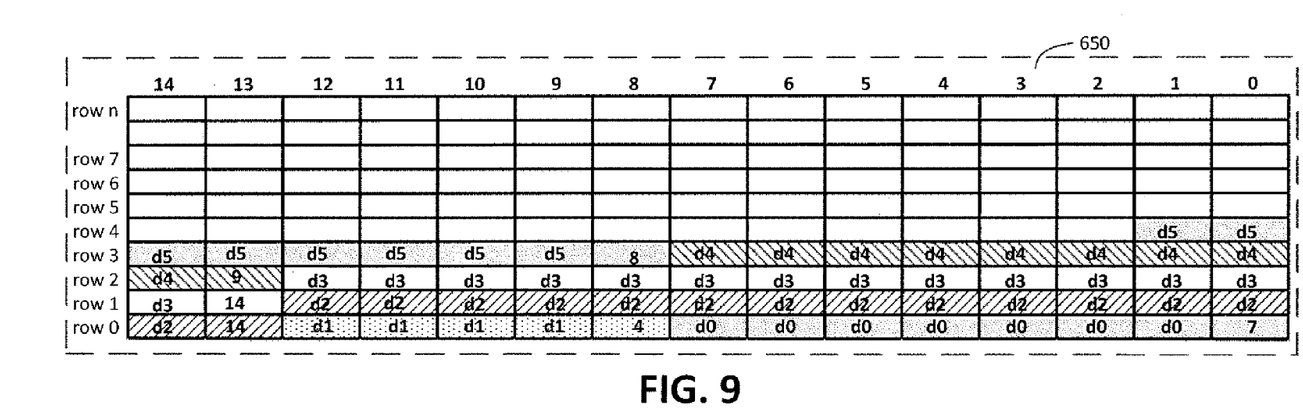
FIG. 9 shows data d0, d1, d2, d3, d4, and d5 stored in the FIFO storage array.

FIG. 9 shows the FIFO storage array 650 of FIG. 8 after two writes of 9 and 8 bytes (d4, d5, plus one byte each for size data) and after reading d2 data. The write pointer points to row 4, with bytes in use=2. The read pointer points to row 1, with a read pointer location of 13. Thus, a subsequent read would obtain size data from byte 13 of row 1 (14 bytes) and would read out the subsequent 14 bytes (up to row 2, byte 12).

It can be seen from FIGS. 6-9 that data can be efficiently stored in a FIFO array even where variable-size data means that data does not automatically fill rows of a FIFO storage array. By using intra-row offsets, in addition to row pointers, for both read and write pointers, the location for the next read or write can be given with precision even where data boundaries are not aligned with rows (i.e. data boundaries occur at random locations within rows). This allows data to be densely packed in the FIFO storage array.

Figure 10:
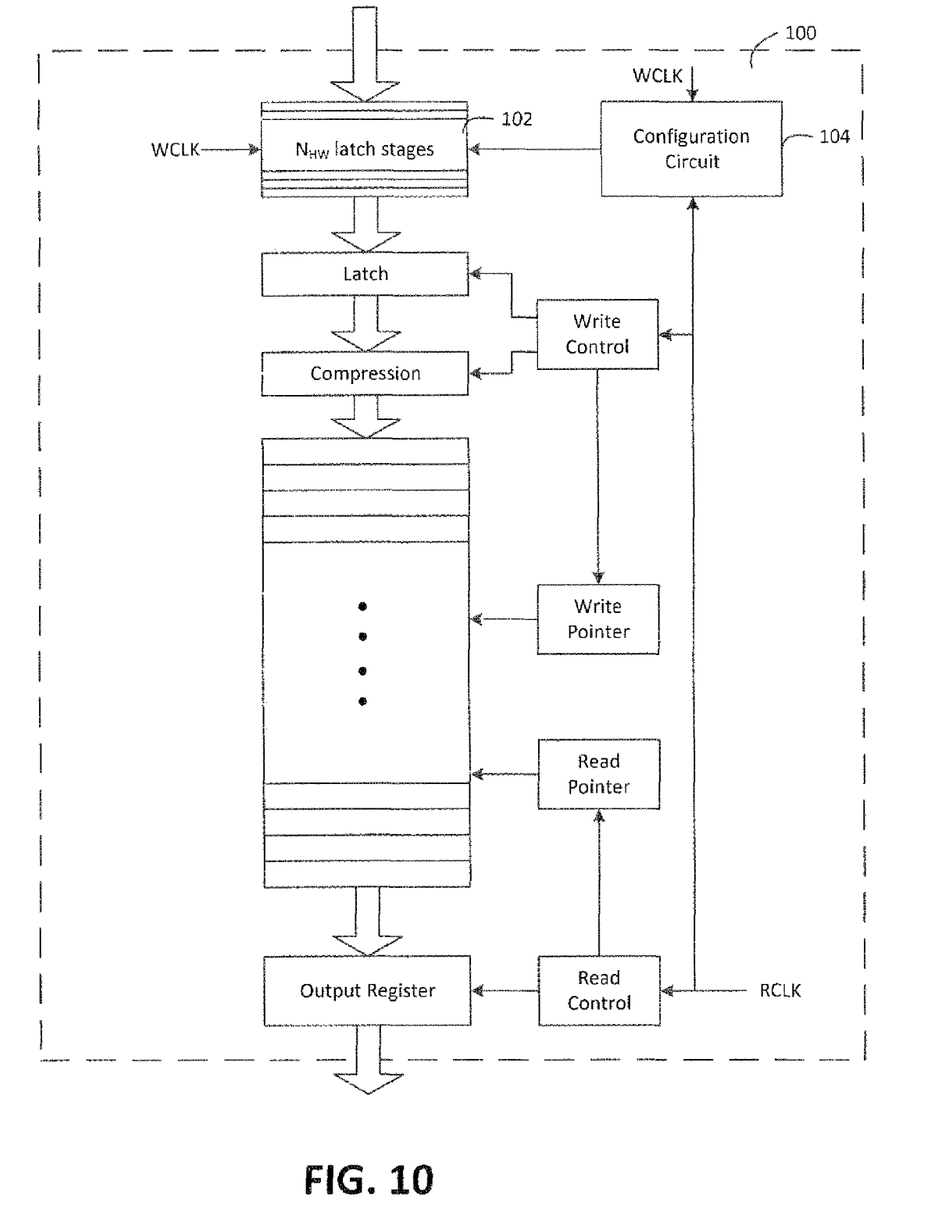
FIG. 10 shows an example of a synchronous FIFO circuit with a configuration circuit.

FIG. 10 shows certain components of a synchronous FIFO 100 according to another embodiment. A data input is provided to a set of $N_{HW}$ latch stages 102, where $N_{HW}$ indicates the number of latch stages physically provided in hardware, although this is not necessarily the number of latch stages actually used at any given time because the number of latch stages that is used is a configurable number $N_{Config}$. A configuration circuit 104 is shown that receives both the write clock signal and the read clock signal. The configuration circuit may perform a comparison of the clock speeds to determine a ratio between the two clock speeds (i.e. may determine WCLK/RCLK). For a given value of WCLK/RCLK, the configuration circuit may then configure the latch stages so that the number of latch stages that are actually used, $N_{Config}$, is equal to WCLK/RCLK (i.e. configuration circuit configures a number of latch stages $N_{Config}$=WCLK/RCLK). Alternatively, an interface may be provided that allows the clock ratio to be specified externally and provided to the configuration circuit so that the appropriate number of latch stages can be configured for use. Latch stages that are not configured ($N_{HW}$-$N_{Config}$ in this example) remain idle.

A synchronous FIFO that contains a configurable set of latch stages may be adaptive to different clock ratios. Thus, such a FIFO may be designed as a generic synchronous FIFO for use in different locations where components operate at different multiples of a clock signal. Such a FIFO may be permanently configured for a particular clock ratio e.g. using fuses or other one-time configuration elements. Alternatively, such a FIFO may be reconfigurable on-the-fly so that, for example, it may operate with a 2:1 clock ratio at a first time and subsequently operate with a 3:1 clock ratio. Such a reconfiguration may be either a result of an external command, or a result of a determination that the clock ratio has changed.

Figure 11:
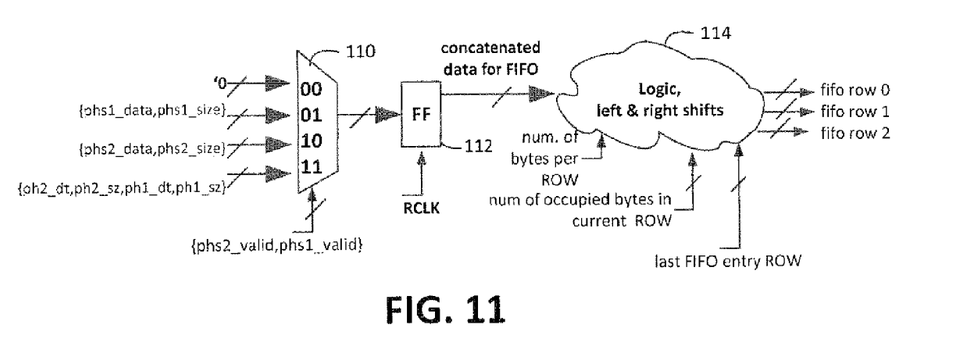
FIG. 11 shows combining variable-length data and partial-row data.

FIG. 11 shows an implementation of a write operation for a two-latch stage embodiment (i.e. for N=2 as shown in FIG. 5). Four inputs are provided to a multiplexing stage 110 that is driven by valid flags associated with the two phases (phs2_valid, phs1_valid). The four inputs represent: no valid data "0", phase 1 data and data size (phs1_data, phs1_size), phase 2 data and data size (phs2_data, phs2_size), and combined phase 1 and phase 2 data and size (ph2_dt, ph2_z, ph1_dt, ph1_sz). One of these four inputs is selected as an output according to the data valid flags. If both flags indicate "invalid" then there is no valid data. If one of the flags is valid and the other is invalid, then the data and data size for the appropriate phase is output (either phase 1 or phase 2). If both flags are valid then the combined phase 1 and phase 2 data and data size are output. The data from the multiplexing stage 110 is stored in a flip-flop circuit 112 that operates at read clock speed RCLK. Then a logical operation 114 determines how to store the data in the FIFO storage array. The number of bytes per row and the number of occupied bytes in the current row of the FIFO storage array determine the amount of remaining space in the current row, and the amount of data per row that will fit in subsequent (empty) rows. Partial-row data may be read out from the FIFO storage array and left and right shifts may be performed to append stored data to partial-row data. The combined data is then provided as an output (or outputs) to up to three rows of the FIFO storage array (FIFO rows 0-2 in FIG. 11). For example, the write operation illustrated in FIGS. 6-7 affected just one row (row 0), while the write operation of FIGS. 7-8 affected three rows (rows 0-2). Write pointers may be maintained for three rows for such a circuit (i.e. write pointers for next row—which may contain partial-row data, and two subsequent rows). In other examples, depending on the value of N and the size of a row of the FIFO storage array, a different number of rows may be affected and a different number of write pointers may be maintained.

Figure 12:
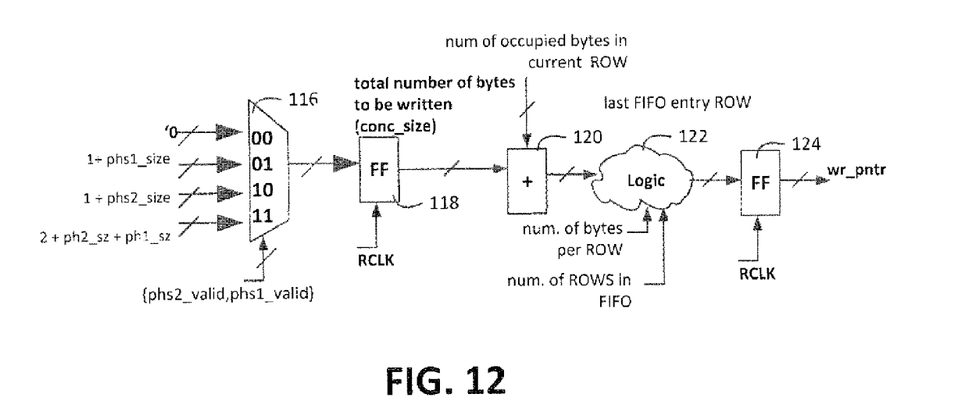
FIG. 12 shows using data-length information to update a write pointer.

FIG. 12 illustrates how size information relating to variable-length data may be used to update a write pointer. The sizes of variable-length data portions in latch stages are provided as inputs to a multiplexing stage 116 in a similar manner to the data itself (as shown in FIG. 11). Zero, phase 1 size, phase 2 size, and combined phase 1 and phase 2 sizes are provided as inputs, with an additional "1" for each phase because size information itself uses one byte of space in the FIFO storage array in this example. The appropriate size information is selected depending on the valid flags (as for the data in FIG. 11). The number of bytes to be written (including bytes used to store size information) is stored in a flip-flop 118, and then added by an adder 120 to the number of occupied bytes in the current row to give the length of data to be written (including partial-row data that is to be written back to the FIFO storage array). A logic operation 122 then determines the new position of the write pointer based on the number of bytes per row and the number of rows in the FIFO storage array. The new position may be stored in a flip-flop 124 so that it is available for future write operations.

Figure 13:
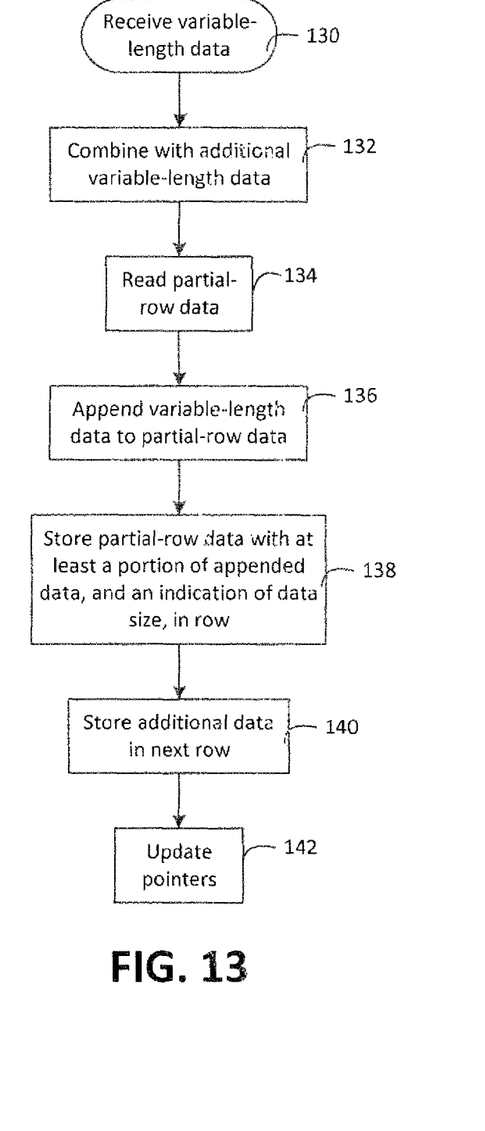
FIG. 13 shows a method of storing variable-length data in a FIFO.

FIG. 13 shows a process for storing variable-length data in a FIFO. The variable-length data is received 130 from an input and may be latched into a latch stage. The data is then combined 132 with other variable-length data from other latch stages so that multiple data words are combined. Partial-row data (if any) is read out 134 of a row of the FIFO storage array. The variable-length data is then appended 136 to the partial-row data. The partial-row data is then written back to a row of the FIFO storage array with at least part of the appended variable-length data and an indicator of the size of the variable-length data 138. Additional data may be stored in the next row 140 and, if necessary, in one or more additional rows (along with an additional indicators of data size). Write pointers are then updated 142 to reflect the next area of the FIFO storage array (row, or rows, and location within row) to be written.

Figure 14:
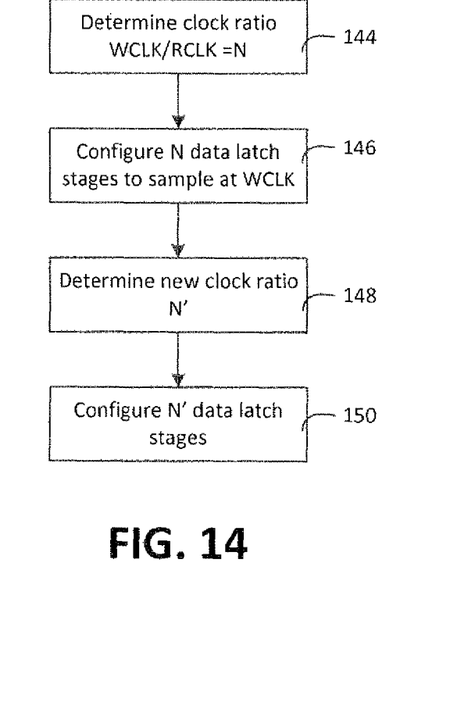
FIG. 14 shows a method of configuring a FIFO for varying clock speeds.

FIG. 14 shows a process for adapting to changing clock speed ratio on-the-fly. At a first time, a determination is made 144 that clock speed ratio WCLK/RCLK is N. This may be the result of an external command, some configuration performed during initialization, or a determination by a circuit within the FIFO circuit. In response, N latch stages are configured for sampling input data 146 and any additional latch stages that may be provided in hardware remain idle. Subsequently, it is determined that the clock speed ratio WCLK/RCLK has changed to N' 148 (where N' is not equal to N). In response, N' data latch stages are configured for sampling input data 150 and any additional latch stages become idle.

It will be understood that various examples provided here are for illustration and are not limiting. For example, certain examples show two latch stages and a clock ratio of 2:1 for simplicity. However, various other numbers of latch stages and clock ratios may be implemented. Combining variable-length data and partial-row data may use any suitable hardware and is not limited to the examples of hardware as shown. Size data stored in the FIFO storage array may occupy more than a byte where the allowable data size is large. A FIFO storage array may have different depth depending on requirements, and rows may be of any size. While examples above refer to data in bytes, any suitable unit of data may be used, from one bit upwards.

Conclusion

Although the various aspects of the present invention have been described with respect to exemplary embodiments thereof, it will be understood that the present invention is entitled to protection within the full scope of the appended claims. Furthermore, although the present invention teaches the method for implementation with respect to particular prior art structures, it will be understood that the present invention is entitled to protection when implemented in memory arrays with architectures than those described.

It is claimed:

1. A method of operating a synchronous First-In, First-Out (FIFO) circuit, with variable-length data, comprising:
   receiving variable-length data from an input;
   reading partial-row data from a partially-filled row of a FIFO storage array;
   appending the received variable-length data to the partial-row data; and
   storing the partial-row data, together with at least a first portion of the appended received variable-length data, in a first row of the FIFO storage array.

2. The method of claim 1 further comprising storing a second portion of the appended received variable-length data in a second row of the FIFO storage array.

3. The method of claim 2 wherein the storing the second portion of the appended received variable-length data in the second row partially-fills the second row.

4. The method of claim 3 further comprising updating a write pointer to indicate an offset from an end of the second row, the offset determined by the length of the second portion of the appended received variable-length data in the second row.

5. The method of claim 1 further comprising storing an indication of the length of the variable-length data in the FIFO storage array.

6. The method of claim 1 wherein the input operates at a write clock speed (WCLK), and wherein the reading, the appending, and the storing are performed at a read clock speed (RCLK) that is related to the write clock speed by: RCLK=WCLK/N, where N is a positive integer.

7. A method of operating a synchronous First-In, First-Out (FIFO) circuit, at a fraction of a write clock speed, comprising:

receiving an input at the write clock speed (WCLK);

sampling the input in N latches, where N is an integer that is greater than 1, each of the N latches sampling every N clock cycles;

combining the contents of the N latches at a read clock speed (RCLK), the read clock speed given by:

RCLK=WCLK/$N$;

storing the combined contents of the N latches in a storage array at the read clock speed; and reading the storage array at the read clock speed.

8. The method of claim 7 further comprising, operating the FIFO with a first value of N at a first time, and subsequently operating the FIFO with a second value of N that is different to the first value of N.

9. The method of claim 8 wherein changing from the first value of N to the second value of N is in response to receiving a command.

10. The method of claim 8 wherein changing from the first value of N to the second value of N is in response to a determination by a configuration circuit that WCLK and/or RCLK has changed and a subsequent recalculation of N by the configuration circuit.

11. The method of claim 7 wherein the input is of variable data-length and wherein combining the contents of the N latches includes compressing the contents of the N latches if they are less than full.

12. The method of claim 11 wherein combining the contents of the N latches further comprises combining partial-row data that is read out from a partially-filled, partially-empty row of the storage array.

13. A synchronous First-In, First-Out (FIFO) circuit with variable clock ratio, comprising:

$N_{HW}$ input latch stages for receiving variable-length data, where $N_{HW}$>1;

a FIFO storage array; and a data compression circuit that combines partial-row data from a row in the FIFO storage array with variable-length data from $N_{Config}$ of the $N_{HW}$ input latch stages prior to storing the combined partial-row data and the variable-length data together in the FIFO storage array.

14. The synchronous FIFO of claim 10 wherein the variable-length data is received at a write clock speed (WCLK), and combined data is stored at a read clock speed (RCLK), where WCLK=$N_{Config}$*RCLK.

15. The synchronous FIFO of claim 11 further comprising a configuration circuit that determines a value for $N_{Config}$ based on WCLK and RCLK, and configures $N_{Config}$ of the $N_{HW}$ input latch stages to receive the variable-length data for combination with partial-row data, with remaining $N_{HW}$-$N_{Config}$ input latch stages configured to be idle.

16. A synchronous First-In, First-Out (FIFO) circuit for variable-length data, comprising:

a FIFO storage array;

an input latching unit for receiving variable-length data; and a data compression circuit that reads partial-row data from a partially filled row of the FIFO storage array, appends variable-length data from the input latching unit, and stores the partial-row data, together with at least a first portion of the appended variable-length data, in a first row of the FIFO storage array.

17. The synchronous FIFO of claim 16 wherein the input latching unit contains N input latch stages.

18. The synchronous FIFO of claim 17 wherein the input latching unit receives a write clock signal and each of the N input latch stages samples input data every N cycles of the write clock signal.

19. The synchronous FIFO of claim 18 wherein the data compression circuit reads, appends, and stores at a read clock speed (RCLK) that is related to the write clock speed (WCLK) by: WCLK/RCLK=N.

* * * * *